(12) United States Patent
Patsouris et al.

(10) Patent No.: US 10,443,609 B2
(45) Date of Patent: Oct. 15, 2019

(54) LEVER ARM DEVICE FOR CONTROLLING THE PITCH OF FAN BLADES OF A TURBINE ENGINE HAVING AN UNDUCTED FAN

(71) Applicant: SAFRAN AIRCRAFT ENGINES, Paris (FR)

(72) Inventors: Emmanuel Pierre Dimitri Patsouris, Melun (FR); Olivier Belmonte, Perthes en Gatinais (FR); Clementine Charlotte Marie Mouton, Tournan en Brie (FR); Thomas Julien Nguyen Van, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 940 days.

(21) Appl. No.: 15/137,302

(22) Filed: Apr. 25, 2016

(65) Prior Publication Data
US 2017/0343008 A1 Nov. 30, 2017

(30) Foreign Application Priority Data

May 12, 2015 (FR) ..................................... 15 54279

(51) Int. Cl.
*F04D 29/36* (2006.01)
*B64C 11/30* (2006.01)
(Continued)

(52) U.S. Cl.
CPC .......... *F04D 29/362* (2013.01); *B64C 11/308* (2013.01); *F02K 3/06* (2013.01); *B64D 2027/005* (2013.01); *Y02T 50/66* (2013.01)

(58) Field of Classification Search
CPC ............. F05D 2260/74; F05D 2260/70; F05D 2260/79; F05D 2260/76; F03D 7/0224;
(Continued)

(56) References Cited

U.S. PATENT DOCUMENTS 2,479,668 A * 8/1949 Brandon ................. B64C 11/30
                                                                123/41.12
3,920,353 A    11/1975 Bredsted
(Continued)

FOREIGN PATENT DOCUMENTS

| DE | 24 01 893 A1 | 7/1974 | |
|---|---|---|---|
| FR | 2 957 329 A1 | 9/2011 | |
| WO | WO-2013050704 A1 * | 4/2013 | ........... B64C 11/385 |

OTHER PUBLICATIONS

French Preliminary Search Report dated Mar. 1, 2016, in French Application 15 54279, filed May 12, 2015 (with English Translation of Categories of Cited Documents).

*Primary Examiner* — Justin D Seabe
*Assistant Examiner* — Joshua R Beebe
(74) *Attorney, Agent, or Firm* — Oblon, McClelland, Maier & Neustadt, L.L.P.

(57) ABSTRACT

A device for controlling the pitch of fan blades in a turbine engine having an unducted fan including at least one set of adjustable pitch fan blades, each fan blade being coupled, for pitch adjustment purposes, to a radial control shaft constrained to rotate with the set of fan blades and suitable for pivoting about a radial pitch axis of the fan blade, the device including a stationary actuator centered on a longitudinal axis of the turbine engine and driving an outer ring of a load transfer bearing in translation, the outer ring of the load transfer bearing being coupled directly to a lever arm of each control shaft via a respective ball joint connection in order to adjust its pivoting.

7 Claims, 4 Drawing Sheets

(51) Int. Cl.
*F02K 3/06* (2006.01)
*B64D 27/00* (2006.01)

(58) Field of Classification Search
CPC .......... F02C 9/58; F04D 29/362; F04D 29/36; B64C 11/308; B64C 11/32; B64C 11/366; F02K 3/06; B64D 2227/005; Y02T 50/66
See application file for complete search history.

(56) References Cited

U.S. PATENT DOCUMENTS

| | | | | |
|---|---|---|---|---|
| 4,842,484 | A * | 6/1989 | Johnson | B64C 11/306 |
| | | | | 415/130 |
| 5,431,539 | A * | 7/1995 | Carvalho | B64C 11/32 |
| | | | | 416/157 R |
| 6,688,926 | B1 * | 2/2004 | Willmot | B63H 3/02 |
| | | | | 416/165 |
| 2012/0070290 | A1 * | 3/2012 | Balk | B64C 11/32 |
| | | | | 416/147 |
| 2012/0093652 | A1 * | 4/2012 | Belmonte | B64C 11/06 |
| | | | | 416/147 |
| 2013/0011259 | A1 | 1/2013 | Balk et al. | |
| 2014/0294585 | A1 * | 10/2014 | Escure | B64C 11/385 |
| | | | | 416/147 |

* cited by examiner

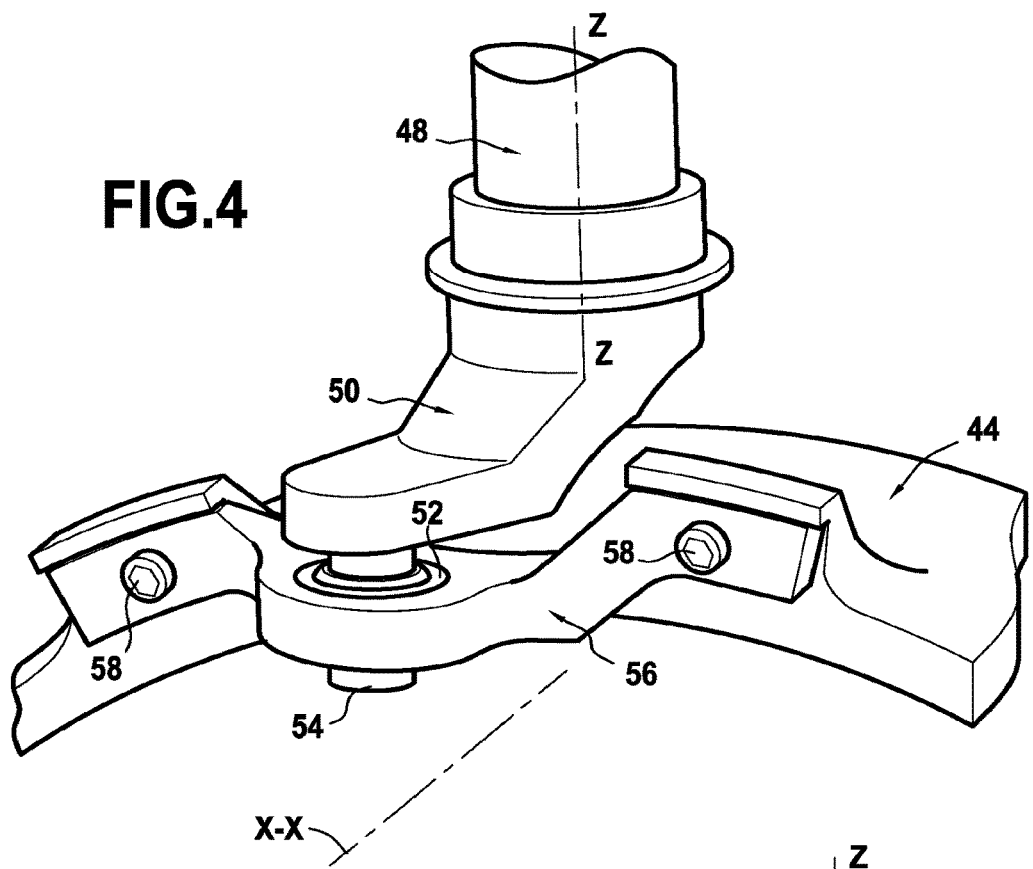
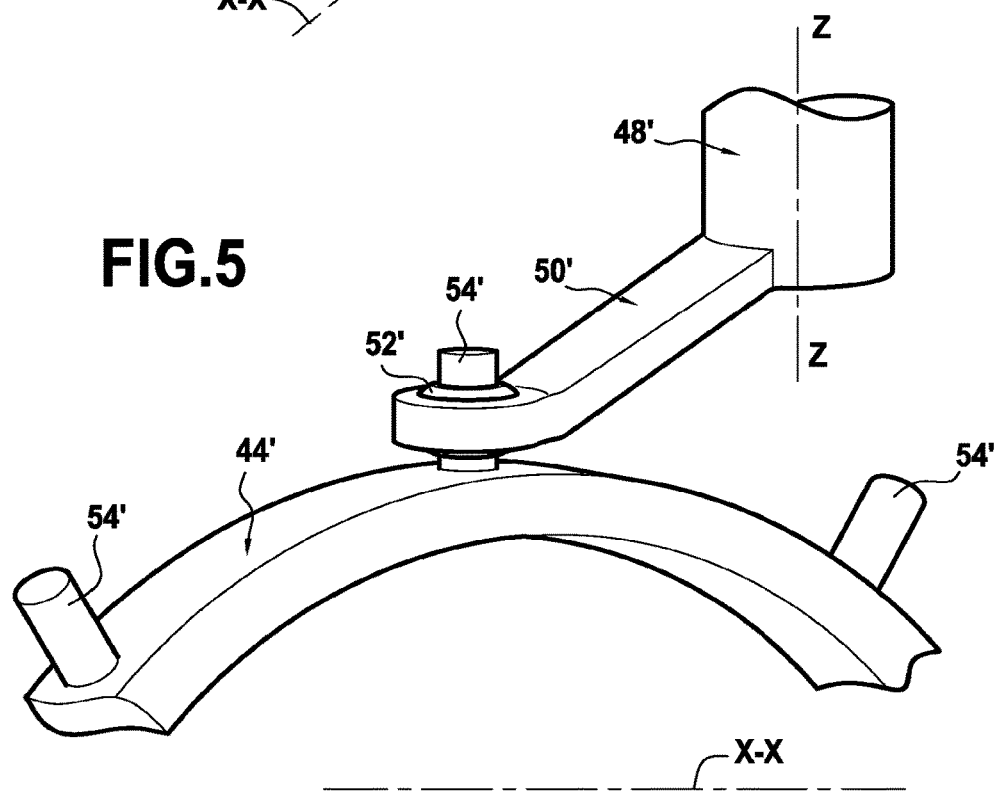

LEVER ARM DEVICE FOR CONTROLLING THE PITCH OF FAN BLADES OF A TURBINE ENGINE HAVING AN UNDUCTED FAN

BACKGROUND OF THE INVENTION

The present invention relates to the general field of turbine engines fitted with one or two unducted fans, and more particularly it relates to controlling the pitch of the fan blades of such engines.

A preferred field of application for the invention lies in open-rotor turbojets having two contrarotating propellers, which may be located relative to the gas generator, either downstream in a "pusher" configuration, or upstream in a "puller" configuration. Nevertheless, the invention also applies to turboprops having one or more propulsive propellers.

In a turbojet with contrarotating propellers, it is known that the pitch of the blades constituting the propellers constitutes one of the parameters enabling the thrust of the turbojet to be controlled, in particular by ensuring that the propeller always operates under the best possible conditions. Specifically, the speed of rotation of the propellers is practically constant during all stages operation, and it is the pitch of the propeller blades that varies thrust. Such pitch variation serves in particular to enable the propeller to operate under the best possible conditions. Thus, during a stage of cruising flight, it is desired to obtain the lowest possible power on the turbine shaft that is needed in order to obtain given traction at a given speed of the airplane so as to obtain best efficiency (i.e. the efficiency that serves to minimize fuel consumption and increase range). Conversely, during takeoff, the strongest possible traction is sought in order to accelerate the airplane and then cause it to take off.

The mechanism for controlling the pitch of the propeller blades of the turbojet is generally incorporated inside the hub carrying the propellers. More precisely, the pitch of each blade making up a propeller is typically controlled by a radial control shaft that coincides with a stacking axis of the blade and that has a lever arm at its inner end for controlling turning thereof about the stacking axis. An actuator that is stationary relative to the structures of the engine and that is centered on the longitudinal axis of the engine, then serves to drive movement in translation of the inner ring of a load transfer bearing (LTB) that is positioned in line with the actuator. The bearing serves to transmit the movement in translation from the stationary reference frame associated with the actuator to a rotary reference frame associated with the blades. Furthermore, for each control shaft, a pitch control rod connects the end of each lever arm to the outer ring of the LTB. Reference may be made in particular to Document WO2013/050704, which describes an implementation of such control.

The assembly formed by the control arm, the pitch setting rod, and the load transfer bearing, is not itself isostatic. Specifically, for a given actuator setpoint, the axial position of the bearing is determined but its outer ring is free to turn, thus implying a multitude of possible pitch settings for the corresponding blade. In order to remedy this problem, it is known to block the outer ring of the load transfer bearing against turning by coupling it to an antirotation connection rod that is itself connected to the rotary structures of the engine.

Nevertheless, that solution requires a large number of parts, thereby leading to large weight and non-negligible axial bulk (which axial bulk indirectly implies an increase in weight as a result of extra casings being present).

OBJECT AND SUMMARY OF THE INVENTION

A main object of the present invention is thus to propose a blade pitch control device that does not have the above-mentioned drawbacks.

This object is achieved by a device for controlling the pitch of fan blades in a turbine engine having an unducted fan comprising at least one set of adjustable pitch fan blades, each fan blade being coupled, for pitch adjustment purposes, to a radial control shaft constrained to rotate with the set of fan blades and suitable for pivoting about a radial pitch axis of said fan blade, the device comprising a stationary actuator centered on a longitudinal axis of the turbine engine and driving an outer ring of a load transfer bearing in translation, said outer ring of the load transfer bearing being coupled directly to a lever arm of each control shaft via a respective ball joint connection in order to adjust its pivoting.

The control device of the invention is remarkable in that it consists in eliminating all of the connecting rods from the system, in particular the pitch setting connecting rods that are typically provided between each control shaft and the outer ring of the load transfer bearing. Likewise, there is no need for any antirotation connection rod for the outer ring of the bearing, since this function is performed directly by the control shafts. This gives rise to a device of low weight (because of its limited number of parts) and of small bulk, in particular in the axial direction, as a result of limiting recourse to connecting rods.

Preferably, the ball joint connection comprises a radial finger co-operating with a sliding ball joint.

Thus, in an embodiment, the lever arm of each control shaft comprises a sliding ball joint co-operating with a finger extending radially outwards from the the outer ring of the load transfer bearing.

In this embodiment, the fingers of the outer ring of the bearing are inserted in the sliding ball joints of the lever arms of the control shafts and they can move radially in translation along the axes of the ball joints. This degree of freedom is essential to enable the mechanism to be moved. Specifically, the fingers of the outer ring of the bearing move at constant radius, while the center of each sliding ball joint moves in a plane normal to the axis of the corresponding control shaft.

In another embodiment, the outer ring of the load transfer bearing comprises a respective sliding ball joint for each control shaft, the ball joint co-operating with a finger extending radially inwards from the lever arm.

In this embodiment, the sliding ball joints are incorporated directly in the outer ring of the bearing, and the fingers, which are inserted in and move in translation inside these ball joints, form integral parts of the lever arms of the control shafts.

Still in this other embodiment, the sliding ball joints of the outer ring of the load transfer bearing are preferably mounted on brackets that are independent of said outer ring of the load transfer bearing and that are fastened against a side face thereof. This characteristic makes it possible to envisage mounting the elements of the device axially, and thus of enabling it to be integrated in a constricted environment. More precisely, the fingers of the lever arms of the control shafts are initially inserted in the ball joints of the brackets, and then the assembly is moved axially against the upstream side face of the outer ring of the LTB in order to be fastened thereto (e.g. by means of the bolts).

Preferably, the connection between the outer ring of the transfer bearing and the lever arm of each control shaft does not include any connecting rod between said lever arm and said outer ring.

Each fan blade may be mounted on a blade root support that is pivotally mounted on a rotary ring and that is coupled to an outer radial end of a control shaft.

The invention also provides a turbine engine having an unducted fan, including at least one set of adjustable pitch fan blades and at least one blade pitch control device as defined above.

BRIEF DESCRIPTION OF THE DRAWINGS

Other characteristics and advantages of the present invention appear from the following description made with reference to the accompanying drawings, which show an embodiment having no limiting character. In the figures:

FIG. 4 is an enlargement of FIG. 2 showing the link between the outer ring of the load transfer bearing and a control shaft; and FIG. 5 is a view showing a fragment of a control device in another embodiment of the invention.

DETAILED DESCRIPTION OF THE INVENTION

Figure 1:
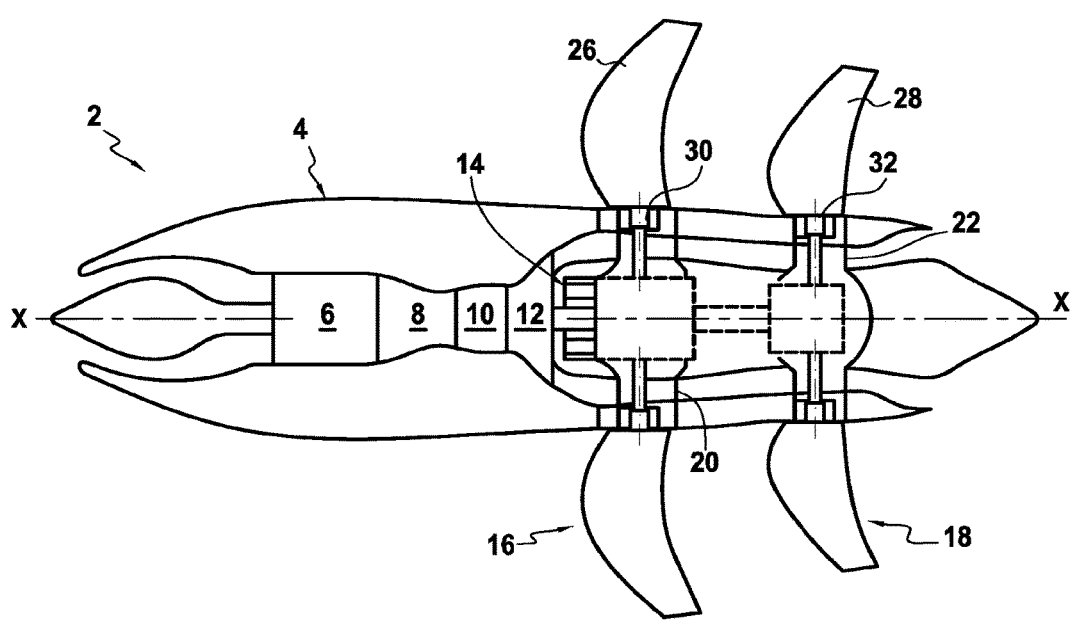
FIG. 1 is a diagrammatic longitudinal section view of a turbojet with contrarotating propellers to which the invention applies.

The invention applies to a turbine engine having at least one unducted fan, in particular to turboprops having one or more propulsive propellers, and also to open-rotor turbojets having two contrarotating propellers located relative to the gas generator either upstream in a "puller" configuration, or else downstream in a "pusher" configuration, like the pusher type turbojet 2 shown diagrammatically in FIG. 1.

In known manner, the turbojet 2 comprises, from upstream to downstream in the flow direction of the gas flow inside a nacelle 4 of the turbojet: one or two compressors 6 (depending on the single- or two-spool architecture of the gas generator); a combustion chamber 8; a high-pressure turbine 10 (or a high-pressure turbine and an intermediate pressure turbine, depending on said architecture); and a low-pressure turbine 12 that acts, via an epicyclic step-down gearbox 14, to drive an upstream propeller 16 and a downstream propeller 18 in contrarotation, which propellers are in axial alignment on the longitudinal axis X-X of the turbojet and are located downstream from the combustion chamber.

For this purpose, the upstream propeller 16 is secured to a rotary ring 20 centered on the longitudinal axis X-X of the turbojet and coupled in rotation to one outlet of the gearbox 14 in order to rotate in one direction, while the downstream propeller 18 is secured to another rotary ring 22 likewise centered on the axis X-X and coupled in rotation to another outlet of the gearbox 14 in order to rotate in an opposite direction. The coupling between the outlets of the gearbox and the rotary rings of the propellers is conventional and is therefore not described in detail herein.

Furthermore, each blade 26 of the upstream propeller 16 and each blade 28 of the downstream propeller 18 is provided with a root that is mounted on a respective blade root support 30, 32, each of these blade root supports being pivotally mounted on the corresponding rotary ring 20, 22.

Thus, pivoting of the blade root supports about the stacking axes of the blades they carry enables the orientation or pitch of the blades to be varied.

The turbojet 2 also has a device of the invention for controlling the pitch of the blades of each propeller 16, 18. Such a device for controlling the pitch of the blades 26 of the upstream propeller 16 is shown diagrammatically in FIGS. 2 and 3. Naturally, the device is equally applicable to controlling the pitch of the blades of the downstream propeller of the turbojet.

In known manner, the control device comprises in particular an annular actuator 34 centered on the longitudinal axis X-X of the turbojet, and a link mechanism connecting the actuator to the supports 30 for the roots of the blades 26 of the upstream propeller.

The actuator 34 surrounds a stationary annular casing 36 of the turbojet, being secured thereto in such a manner that its static portion (i.e. its rod) is prevented from moving relative thereto, both in rotation and in translation. The chamber 38 of the actuator is suitable for moving axially (i.e. along the longitudinal axis X-X), and it is connected to the link mechanism.

The link mechanism comprises in particular a load transfer bearing (LTB) 40 provided with an inner ring 42 mounted on the chamber 38 of the actuator 34 and an outer ring 44, the inner and outer rings defining raceways for rolling elements (two rows of balls 46 in this example). As a result, an axial movement of the chamber 38 of the actuator drives the same movement in translation of the LTB along the longitudinal axis X-X.

The link mechanism also has radial control shafts 48 (i.e. shafts that are arranged radially relative to the longitudinal axis X-X of the turbojet), each control shaft being designed to adjust the pitch of at least one blade 26 of the upstream propeller.

More precisely, each control shaft 48 may extend along a radial axis Z-Z that may optionally coincide with the stacking axis of the blade 26 for which it controls the pitch. These control shafts 48 are suitable for pivoting about their radial axes Z-Z while being constrained to rotate with the rotary ring 20 that drives the upstream propeller in rotation.

Furthermore, at its radially outer end, each control shaft 48 is coupled to at least one blade root support 30 for the blades of the upstream propeller by any conventional means. As a result, pivoting of the control shafts 48 about their radial axes Z-Z causes the pitch of the blades 26 of the upstream propeller to be modified.

Reference may be made to French patent application number 15/54275 filed by the Applicant on May 12, 2015 and entitled "Dispositif a arbre radial pour la commande de l'orientation des pales de soufflante d'une turbomachine a soufflante non carénée" [A radial shaft device for controlling the pitch of fan blades of a turbine engine having an unducted fan], which application describes such a linkage.

At its radially inner end, each control shaft 48 presents a lever arm 50 that pivots with the control shaft about its radial axis Z-Z. This lever arm may be integral with the control shaft so that together they form a single piece. Alternatively, the lever arm may be an element that is distinct from the control shaft, as described in French patent application number 15/54280 filed by the Applicant on May 12, 2015 with the title "Arbre de commande radial pour dispositif de commande de l'orientation des pales de soufflante d'une turbomachine a soufflante non carénée et procédé de montage d'un tel arbre" [A radial control shaft for a device for controlling the pitch of fan blades of a turbine engine having an unducted fan, and a method of mounting such a shaft].

The link mechanism also includes means for directly coupling the lever arms 50 of the control shafts to the outer ring 44 of the LTB 40. The term "directly coupling" is used to mean that the connection between the lever arm and the outer ring does not include any connecting rod or other similar element.

Figure 2:
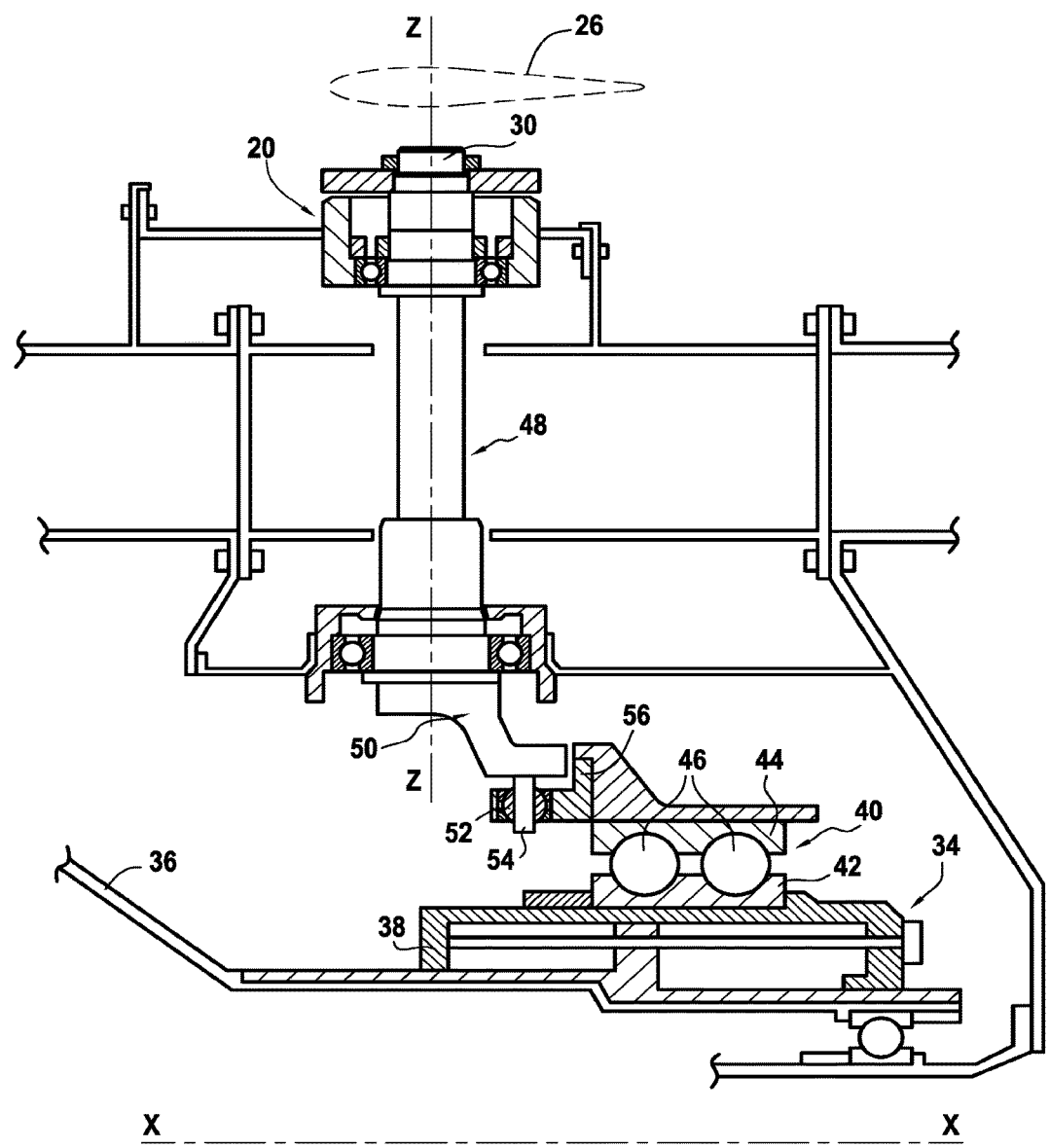
FIGS. 2 and 3 are longitudinal section views of a control device in an embodiment of the invention in two different pitch positions.
Figure 3:
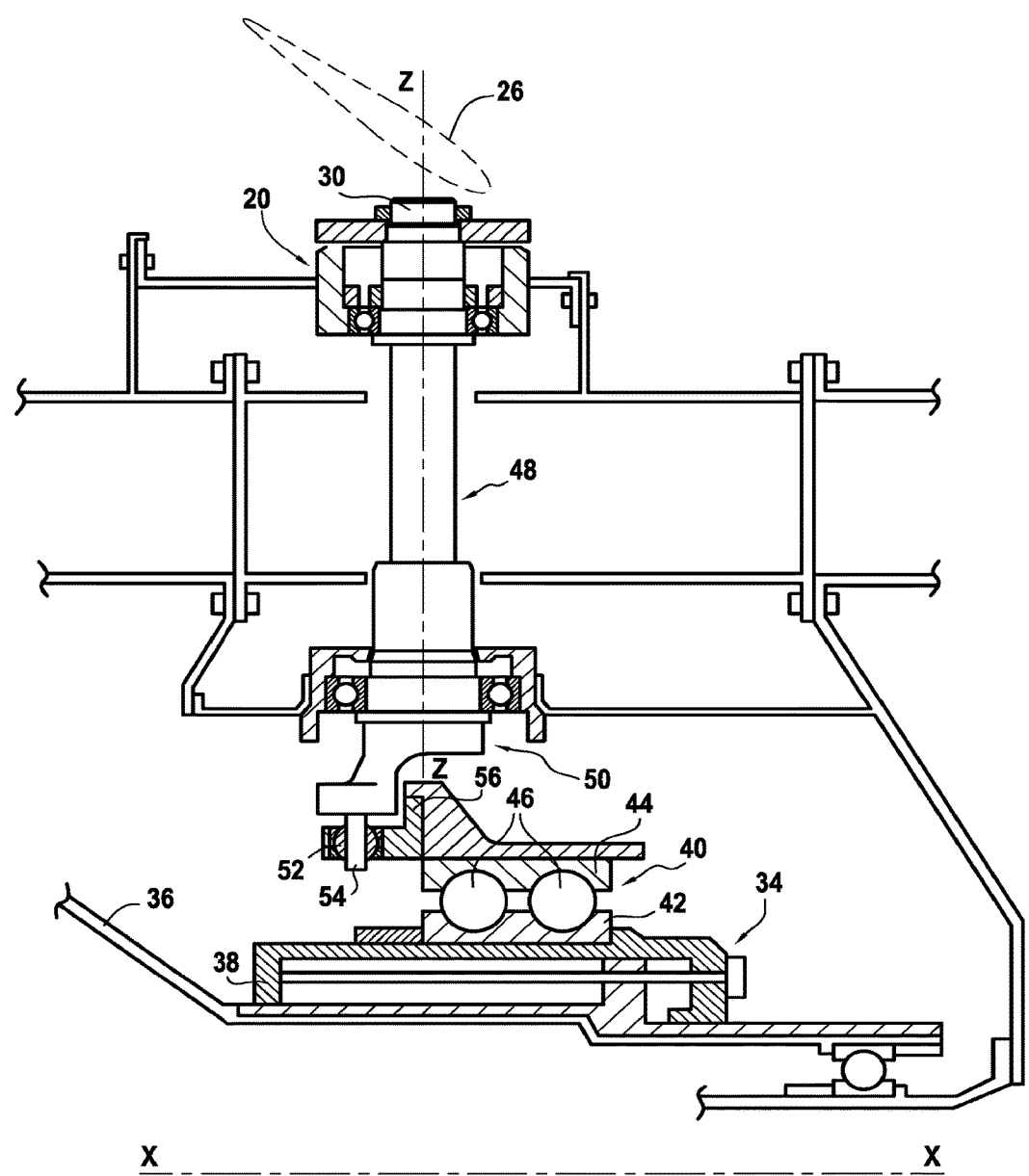

In the embodiment of FIGS. 2 to 4, the coupling between the lever arm 50 and the outer ring 44 of the bearing is provided by means of a ball joint 52 secured to the outer ring and co-operating with a finger 54 of the lever arm.

More precisely, in this example, the lever arm terminates in a finger (or pin) 54 that extends radially inwards (i.e. towards the longitudinal axis X-X). This finger 54 becomes inserted inside a sliding ball joint 54 secured to the outer ring 44 of the LTP 40, the ball joint enabling the finger of the lever arm to slide a radially therein.

For this purpose, the sliding ball joints 52 of the outer ring 44 of the LTB are mounted on respective brackets 56 (or tabs) independent of said outer ring of the bearing, these brackets 56 being fastened against a side face thereof (in this example its upstream face), e.g. by bolts 58.

This arrangement of brackets that are independent of the outer ring of the LTB makes it possible to envisage mounting elements of the control device axially, and thus in a manner that is suitable for being incorporated in a confined environment. More precisely, the fingers 54 of the lever arms 50 of the control shafts 48 are initially inserted in the ball joints 52 of the brackets 56, and then the assembly is moved axially against the upstream side face of the outer ring of the LTB in order to be fastened thereto by means of the bolts 58.

FIGS. 2 and 3 show the operating linkage of the control device in an embodiment in two different angular positions that can be occupied by the blades 26 of the upstream propeller 16.

In order to obtain these different pitch angles for the blades 26, it suffices to actuate the actuator 34 so that its chamber 38 then moves the outer ring 44 of the LTB axially. During this axial movement in translation, the lever arms 50 of the control shafts 48 pivot radially, driving corresponding pivoting of the control shafts about their radial axes Z-Z, and consequently turning the blade root supports in the rotary ring.

It should be observed that during the pivoting of the lever arms about the radial axes of the control arms, the fingers 54 carried by the lever arms slide a radially inside the ball joints 52. This degree of freedom to move is necessary in order to enable the lever arms to pivot.

FIG. 5 shows another embodiment of the invention in which only the outer ring 44' of the LTP and the control shaft 48' together with its lever arm 50' are shown.

This embodiment differs from the above-described embodiment in that the slidable ball joint 52' in this example is housed directly in the lever arm 50' of the corresponding control shaft 48' and it co-operates with a finger (or pin) 54' forming part of the outer ring 44' of the LTP and extending radially outwards (i.e. away from the longitudinal axis of the turbojet).

As a result, in order to obtain different pitch angles for the blades coupled to the control shaft 48', the actuator is actuated, thereby driving axial movement of the outer ring 44' of the LTP. During this axial movement in translation, the lever arms 50' of the control shafts pivot radially, driving corresponding pivoting of the control shafts about their radial axes Z-Z, and consequently turning the blade root supports 30 in the rotary ring.

As in the above embodiment, it should be observed that during the pivoting of the lever arms about the radial axes of the control arms, the fingers 54' carried by outer ring 44' of the bearing slide radially inside the ball joints 52'.

Whatever the embodiment, it should also be observed that the coupling between the lever arms 50, 50' of the control shafts 48, 48' and the outer ring 44, 44' of the LTB is direct, i.e. it does not include any connecting rod or mechanical connection other than the ball joints 52, 52'.

The invention claimed is:

1. A device for controlling a pitch of fan blades in a turbine engine having an unducted fan comprising a set of adjustable pitch fan blades, each fan blade being coupled, for pitch adjustment purposes, to a radial control shaft constrained to rotate with the set of adjustable pitch fan blades and suitable for pivoting about a radial pitch axis of said fan blade, the device comprising:
    an actuator centered on a longitudinal axis of the turbine engine and driving an outer ring of a load transfer bearing in translation, said outer ring of the load transfer bearing being directly coupled to a lever arm of each radial control shaft via only a single respective ball joint connection in order to adjust a pivoting of the radial control shaft.

2. The device according to claim 1, wherein each ball joint connection comprises a radial finger co-operating with a sliding ball joint.

3. The device according to claim 2, wherein the lever arm of each radial control shaft comprises a sliding ball joint co-operating with the radial finger extending radially outwards from the outer ring of the load transfer bearing.

4. The device according to claim 2, wherein the outer ring of the load transfer bearing comprises a respective sliding ball joint for each radial control shaft, the ball joint co-operating with the radial finger extending radially inwards from the lever arm.

5. The device according to claim 4, wherein the sliding ball joints of the outer ring of the load transfer bearing are mounted on brackets that are independent of said outer ring of the load transfer bearing and that are fastened against a side face thereof.

6. The device according to claim 1, each fan blade is mounted on a blade root support that is pivotally mounted on a rotary ring and that is coupled to an outer radial end of a respective radial control shaft.

7. A turbine engine having an unducted fan and a blade pitch control device according to claim 1.

* * * * *